United States Patent
Peters et al.

(10) Patent No.: US 12,329,121 B2
(45) Date of Patent: Jun. 17, 2025

(54) ANALYSING A CLEANING FLUID IN A MILKING MACHINE

(71) Applicant: GEA Farm Technologies GmbH, Bönen (DE)

(72) Inventors: Peter Peters, Hamm (DE); Christoph Zenz, Bochum (DE); Martin Wortmann, Recklinghausen (DE); Henrik Böttner, Bochum (DE)

(73) Assignee: GEA Farm Technologies GmbH, Bönen (DE)

(*) Notice: Subject to any disclaimer, the term of this patent is extended or adjusted under 35 U.S.C. 154(b) by 0 days.

(21) Appl. No.: 18/281,078

(22) PCT Filed: Mar. 2, 2022

(86) PCT No.: PCT/EP2022/055241
§ 371 (c)(1),
(2) Date: Sep. 8, 2023

(87) PCT Pub. No.: WO2022/189225
PCT Pub. Date: Sep. 15, 2022

(65) Prior Publication Data
US 2024/0138363 A1    May 2, 2024

(30) Foreign Application Priority Data
Mar. 9, 2021    (DE) .......... 102021105641.1

(51) Int. Cl.
*A01J 7/02*        (2006.01)
*A01J 5/00*        (2006.01)

(52) U.S. Cl.
CPC .............. *A01J 7/022* (2013.01); *A01J 5/00* (2013.01)

(58) Field of Classification Search
CPC .... A01J 7/02; A01J 7/025; A01J 7/027; A01J 7/022; A01J 5/0131; A01J 5/0133; A01J 5/0135
See application file for complete search history.

(56) References Cited

U.S. PATENT DOCUMENTS

| | | | | |
|---|---|---|---|---|
| 5,275,124 A * | 1/1994 | van der Lely | .......... | A01J 7/022 119/14.08 |
| 5,701,012 A * | 12/1997 | Ho | ...... | G01N 15/1459 250/461.2 |
| 5,895,922 A * | 4/1999 | Ho | ......... | G01N 21/64 250/492.1 |
| 6,089,242 A * | 7/2000 | Buck | ...... | A01J 7/022 134/115 R |

(Continued)

FOREIGN PATENT DOCUMENTS

| | | |
|---|---|---|
| DE | 102005016413 | 10/2006 |
| EP | 1287737 | 10/2003 |

(Continued)

*Primary Examiner* — Ebony E Evans
(74) *Attorney, Agent, or Firm* — BainwoodHuang

(57) ABSTRACT

The invention relates to a device (1) for analysing a cleaning fluid, comprising: •a line portion (2) for the cleaning fluid, •a light-source unit (4), which emits light into the line portion (2), •a detection unit (5) for spectrally resolved capturing of light exiting the line portion (2), and •an analysis unit (6) which is designed to analyse the cleaning fluid with regard to the constituents on the basis of signals from the detection unit (5).

12 Claims, 6 Drawing Sheets

(56) References Cited

U.S. PATENT DOCUMENTS

Figure 1:
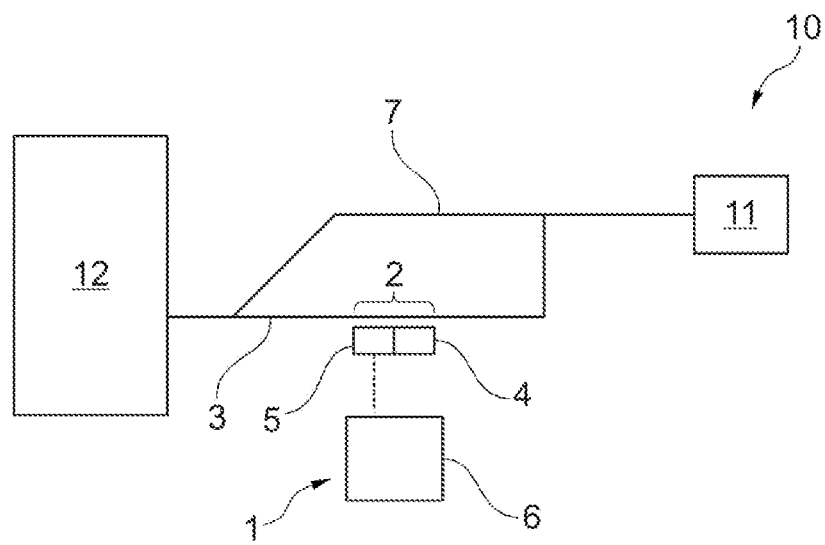

| | | | | |
|---|---|---|---|---|
| 8,525,111 | B1 * | 9/2013 | Brown | H01J 49/24 |
| | | | | 250/281 |
| 9,086,533 | B1 * | 7/2015 | Wach | A61B 5/6876 |
| 10,849,305 | B2 * | 12/2020 | Enickl | A01J 5/007 |
| 11,162,905 | B2 | 11/2021 | Schönrock et al. | |
| 11,346,828 | B2 | 5/2022 | Suhr et al. | |
| 2015/0296736 | A1 * | 10/2015 | Cattaneo | A01J 5/007 |
| | | | | 119/14.08 |
| 2020/0209064 | A1 * | 7/2020 | Owsley | G01J 3/4406 |

FOREIGN PATENT DOCUMENTS

| | | | | |
|---|---|---|---|---|
| EP | 1377813 | | 1/2004 | |
| FR | 2569001 A1 * | | 2/1986 | G01D 5/34 |
| WO | 2006032731 | | 3/2006 | |
| WO | WO-2008146276 A1 * | | 12/2008 | A01J 5/0135 |
| WO | WO-2011056064 A1 * | | 5/2011 | A01J 11/00 |
| WO | 2013081534 | | 6/2013 | |
| WO | WO-2013081534 A1 * | | 6/2013 | A01J 7/022 |
| WO | 2015170975 | | 11/2015 | |
| WO | 202222884 | | 11/2022 | |

* cited by examiner

ANALYSING A CLEANING FLUID IN A MILKING MACHINE

The invention relates to an apparatus for analyzing a cleaning fluid, in particular for cleaning a milking machine. Furthermore, the invention relates to a corresponding milking machine and to a corresponding method.

Raw milk is an important food and an important raw material for the food industry. In order to protect the consumer, for the purpose of technical processability, and also for market control purposes, raw milk must meet certain national and international quality requirements.

In milking apparatuses and methods in general, and in particular in automatic and automated milking using semi- and also fully automatic milking systems, extended functions play an important part. In particular, special emphasis is placed on ensuring quality standards of the milk, in particular also checking for obviously altered milk.

In order to meet the quality requirements made of the milk, milking apparatuses are cleaned regularly. This involves the use of cleaning agents. The chemical composition and application thereof have to be chosen here such that, on the one hand, a sufficient cleaning effect is achieved and, on the other hand, the consumption of cleaning agents is as low as possible and, moreover, no residues of chemical substances remain in pipelines and thus get into the milk. If different cleaning agents are used successively, they additionally have to be coordinated with one another, for example when changing between alkaline and acidic cleaning agents. In order to satisfy these requirements, in accordance with the prior art, the chemical composition of the cleaning agent is specified on the basis of factors such as the size of the machine to be cleaned, the number of milking stations in said machine, and the cross section of the lines to be cleaned. However, this specification is generally performed manually for example before the machine is started up. This is done in particular on the basis of the experience of an operator or technician. In this case, reaction to changed circumstances after such a manual specification is possible only to a limited extent. In order to ensure sufficient cleaning under all circumstances, a cleaning agent administered in an excessive dose and/or an excessively large amount of cleaning agent is therefore often used. That results not only in an unnecessarily large consumption of the cleaning agent, but also in an unnecessarily large consumption of water and energy and in an unnecessarily long cleaning time. Checking whether the desired cleaning is achieved can only be done after cleaning has finished insofar as the lines to be cleaned are checked for remaining deposits. However, such inspection is inaccurate, inflexible and laborious.

It is an object of the present invention, proceeding from the prior art described, to present a possibility, in the context of cleaning a milking machine, for saving raw materials and energy, shortening the cleaning time and nevertheless achieving an improved cleaning result.

This object is achieved by the apparatus, the milking machine and the method as claimed in the independent claims. Further advantageous configurations are specified in the dependent claims.

An apparatus for analyzing a cleaning fluid is presented according to the invention. The apparatus comprises:
 a line portion for the cleaning fluid,
 a light source unit, which emits light into the line portion,
 a detection unit for the spectrally resolved capture of light emerging from the line portion, and in particular
 an evaluation unit configured to analyze the cleaning fluid with regard to constituents on the basis of signals from the detection unit.

The apparatus described serves for analyzing a cleaning fluid used in particular for cleaning a milking machine. In this case, cleaning fluid should be understood to mean not only a pure chemical cleaning agent, but also for example a mixture of water and a chemical cleaning agent or even pure water. The cleaning fluid is preferably liquid. In that case, the cleaning fluid can be referred to as a cleaning liquid. However, the cleaning fluid can also be gaseous, be formed by a foam, or be composed of liquid, gaseous and/or foam-type components. By way of example, compressed air can also be used as a cleaning fluid. The cleaning fluid can achieve a cleaning effect in various ways. In this regard, the cleaning fluid can for example rinse solids out of the line portion and clean the latter in this respect. Additionally or alternatively, the cleaning fluid can achieve a cleaning effect by means of chemical processes, for example by dissolving fat or limescale.

An analysis should be understood to mean that the cleaning fluid is examined with regard to its composition. In this case, the cleaning fluid can be examined with regard to constituents such as chemical cleaning agents or water. A chemical cleaning agent should be understood to mean a substance which brings about a cleaning effect by way of chemical reaction. Moreover, the analysis can involve determining whether the cleaning fluid is present in liquid and/or gaseous form. The analysis can consist in differentiating between the presence and absence of specific substances, without quantifying these substances. The absence of a specific constituent can be established in particular by virtue of the fact that this constituent is not present in the cleaning fluid in an amount that is measurable by the apparatus. In this regard, it is possible for example to determine whether water used as the cleaning fluid for subsequent rinsing also contains residues of a chemical cleaning agent. Alternatively or additionally, it is possible for example to establish the dose with which a chemical cleaning agent is present in the cleaning fluid. If the cleaning agent is for example water with a chemical cleaning agent dissolved therein, the dose indicates the concentration of the chemical cleaning agent.

Physical cleaning is also achieved by the cleaning fluid flowing through the line system. In this case, deposits in the line system can be detached and discharged by the cleaning fluid. In order to obtain turbulent flows in the line system, compressed air passes can be introduced into the flowing cleaning fluid.

Depending on the composition of the cleaning fluid, reactions can occur in the line system between components of the cleaning fluid and the substances situated in the line system. In this case, the analysis of the cleaning fluid can relate to the reaction products situated in the cleaning fluid or to the components of the cleaning fluid as starting materials.

The apparatus can contribute to process monitoring. By way of example, changes in the composition of the cleaning fluid over time can be recognized by the apparatus. That is relevant particularly for the concentration of chemical cleaning agents in the cleaning fluid. The apparatus can thus also recognize whether and when cleaning takes place. In this case, on the basis of the composition of the recognized cleaning fluid, it is also possible to differentiate between different cleaning operations, for example between prior rinsing, main cleaning, intermediate cleaning and subsequent rinsing. The individual cleaning operations differ for example in the type, amount and composition of the cleaning fluid respectively used.

The apparatus comprises a line portion for the cleaning fluid. Line portion should be interpreted as part of a line through which the cleaning fluid can flow. The line portion can be part of a pipe or tube, for example. The line portion has at least one inlet via which the cleaning fluid can be introduced into the line portion, and at least one outlet via which the cleaning fluid can pass out of the line portion. The at least one inlet and the at least one outlet are different from one another. The line portion does not have to be separately delimited from the rest of the line. In particular, it is not necessary for the line portion to extend over exactly one pipe component. The at least one inlet and the at least one outlet merely define the beginning and end, respectively, of the line portion and do not have to coincide for example with a joint between pipe components placed against one another. The line portion is defined physically only insofar as the apparatus is configured to analyze the cleaning fluid within the line portion. That means that the line portion extends at least over the measurement region within which the cleaning fluid can be analyzed. However, the measurement region need not encompass the entire line portion. In particular, it is possible for the measurement region not to extend over an entire line cross section.

The apparatus furthermore has a light source unit and a detection unit. By means of the light source unit, light can be guided into the line portion, for example via a window in a boundary of the line portion. The detection unit can detect light emerging from the measurement chamber, for example via a further window or the above-described window in the boundary of the line portion. The detection unit is preferably coordinated with the light source unit. The detection unit and the light source unit are preferably arranged in such a way that the light which emerges from the line portion and which originates from the light source unit can be detected by the detection unit. The detection unit has one or more detectors. The light source unit and the detection unit serve to spectroscopically analyze the cleaning fluid. That is possible by virtue of the fact that the detection unit is configured for the spectrally resolved capture of the light. That means that the detection unit can capture the light intensity depending on the wavelength. The detection unit can thus record a multiplicity of individual spectral values, in particular from the entire wavelength spectrum of the light which emerges from the line portion and which originates from the light source unit. For the spectrally resolved capture of the light, the detection unit preferably comprises a means for spectrally decomposing the light, for example an interferometer or a dispersive element such as a grating or a prism. In the case of the dispersive element, the latter is preferably mounted rotatably. Alternatively, it is possible to use a spatially resolving detector which can measure the spectrally decomposed light at a measurement time, for example a CCD chip. In that case, the measurement accuracy arises in particular from the resolution of the CCD chip.

Preferably, the detection unit has a detector and an interferometer. An interferometer is an apparatus which generates interference by splitting a light beam into two partial beams and by combining the two partial beams with a path difference. The interferometer and the detector are designed and arranged in such a way that light emerging from the line portion can be spectrally decomposed by the interferometer and then detected by the detector. As a result of the spectral decomposition of the light by the interferometer, the detection unit can capture the light in a spectrally resolved manner. The interferometer thus makes it possible, in the case of the light emerging from the line portion, to determine a multiplicity of individual spectral values within the preferably continuous wavelength spectrum of the light source unit. The interferometer can be a Michelson interferometer or a Fabry-Perot interferometer, for example. Both of these interferometers have a movable mirror. Preferably, the interferometer has an, in particular exactly one, flexible element, which generates different subspectra of the total spectrum of the light source unit.

The detection unit can be automatically adjusted and/or calibrated by feedback of reference values. The detection unit can be adapted in a customer- and/or herd-specific manner. Furthermore, changes in the light source unit over time can be compensated for.

The apparatus is configured to analyze the cleaning fluid within the line portion by virtue of the fact that the light source unit and the detection unit are aligned with the line portion. The measurement region for analyzing the cleaning fluid that is formed by the light source unit and the detection unit falls within the line portion as a result. In this respect, the line portion is distinguished vis-à-vis other line parts.

The apparatus preferably comprises a microelectromechanical system, MEMS for short. A MEMS is a component having a movable microscopic structure. The latter can be actuated by mechanical loading or by application of an electrical voltage. In this regard, the detection unit can be realized by virtue of the fact that an interferometer having a movable mirror as such a microscopic structure is realized. The light source unit can be arranged in a fixed orientation with respect to the MEMS, for example in the form of a common component or in a common housing. The light source unit and the detection unit are preferably arranged in a fixed position and orientation relative to one another. Such an apparatus is particularly small, robust and easily integrable and enables comparatively simple analyses outside a laboratory. Moreover, such an apparatus can be produced comparatively simply and inexpensively in large numbers.

The fact that the apparatus has a light source unit means that one or more light source units are provided. The light source unit preferably comprises one or more light sources. If a light source unit has a plurality of light sources, the latter are preferably designed to be identical to one another. Alternatively, a continuous spectrum covering a desired spectral range can be obtained by means of LEDs coordinated with one another as light sources. A plurality of light sources can be arranged such that the entire measurement region is illuminated uniformly. The light sources can be of identical type or different. Combining different light sources makes it possible to obtain a particularly wide wavelength spectrum. It is also conceivable for the light source unit to have a plurality of discontinuous light sources such as, for example, vapor lamps, in particular sodium vapor lamps or mercury vapor lamps. Moreover, it is possible for the light source unit to be designed to the effect that an external radiation source is coupled in, for example via an optical waveguide. In that case, the light source unit is formed only by the optical waveguide.

The cleaning fluid in the line portion can be analyzed by the apparatus described. The cleaning fluid can thus be analyzed while the cleaning fluid is flowing through the line portion. It is not necessary to take samples and analyze them. Taking samples would firstly be more laborious than analysis in a line portion with through-flow. Secondly, the results of an analysis of samples are typically available only with a delay. By way of example, if a deviation of the composition of the cleaning fluid from predefined target values is recognized in a sample, the milk from a subsequent milking operation that has already been begun must where possible be discarded as contaminated. By contrast, the analysis in the line portion enables the cleaning fluid to be analyzed particularly rapidly and simply, in particular before a milking operation that follows a cleaning process is begun. Moreover, the apparatus described enables a complete analysis of the cleaning fluid, not just the analysis of a sample.

Preferably, the light source unit emits light with a continuous wavelength spectrum into the line portion. A continuous wavelength spectrum should be understood to mean that there is a wavelength range containing every wavelength in the light emitted by the light source unit. The wavelength spectrum thus has a portion without a gap in any case. That does not exclude the wavelength spectrum having a plurality of continuous portions with a respective gap between them. It is preferred, however, for the wavelength spectrum to be free of gaps overall. The wavelength spectrum is preferably a broadband continuous wavelength spectrum. The term "broadband" should be understood relative to the detection range of the detection unit. The wavelength spectrum preferably has wavelengths separated from one another by at least 200 nm, in particular by at least 500 nm. In that case, the wavelength spectrum covers at least a wavelength range which has a width of 200 nm or 500 nm and which contains every wavelength in the light. Particularly preferably, the wavelength spectrum covers at least the wavelengths in the range of 1350 to 2500 nm. The wavelength spectrum is preferably in the near infrared range and/or in the mid-infrared range. In that case, the analysis of the cleaning fluid is infrared spectroscopy. However, it is also conceivable for the wavelength spectrum to entirely or completely cover the range of visible light and/or to entirely or completely cover the UV range. Particularly preferably, the wavelength spectrum covers a wavelength range that can be used to excite chemical bonds in the cleaning fluid to be analyzed. In this regard, the so-called spectral fingerprint of the cleaning fluid can be determined. The wavelength spectrum of the light emitted by the light source unit is preferably continuous in one portion in any case. By way of example, the wavelength spectrum can be a Planck's spectrum, as is present in black body radiation.

By means of the light source unit with a continuous spectrum, the cleaning fluid can be analyzed with regard to different constituents. That can be done in particular in the manner of dispersive spectroscopy. The apparatus is therefore not restricted to the analysis of a single constituent. In the configuration of the apparatus, therefore, it is not necessary to fix the specification to a specific constituent. In this respect, the apparatus described is particularly flexible.

The apparatus furthermore preferably has an evaluation unit. The evaluation unit is configured to analyze the cleaning fluid with regard to constituents on the basis of signals from the detection unit. The evaluation unit can be arranged in a housing together with the light source unit and the detection unit.

As an alternative or in addition to the use of an evaluation unit as part of the apparatus, the cleaning fluid can also be analyzed outside the apparatus, for example by means of a central server and/or by means of a cloud application. The apparatus preferably has an interface via which the signals from the detection unit can be output, in particular to an evaluation unit configured to identify constituents of the cleaning fluid on the basis of signals from the detection unit.

The apparatus and the evaluation unit can be connected to one another via a cable, via a wireless connection and/or via an Internet connection.

For analyzing the cleaning fluid, in particular by means of the evaluation unit, the signals emitted by the detection unit can be evaluated in the manner of dispersive spectroscopy. This is preferably done using a complex evaluation algorithm which can calculate the presence and optionally also the concentration of constituents of the cleaning fluid. The evaluation algorithm uses the measured spectral information as input parameters and calculates therefrom the desired characteristic variables or values to be determined.

The evaluation algorithm can be obtained by a separate system with the aid of reference data and/or using a machine learning program. The signals emitted by the detection unit contain information concerning the light captured by the detection unit. Particularly in the case of a light source unit with a continuous spectrum, the apparatus can be switched over particularly easily to analyze other constituents. In particular, there is no need to change the hardware for this purpose. Instead it is sufficient to change the evaluation algorithm. Moreover, it is possible to adjust the measurement accuracy by adapting the software of the evaluation unit, for example in interplay with a measurement duration. The analysis can thus be changed by means of changing the software, for example by means of a software update. By means of a software update, it is possible in particular to extend the functional scope of the evaluation, for example by means of enabling a previously disabled function or a functional extension (actual addition of the function). The functioning of the evaluation can thus be changed without a construction change.

The evaluation is preferably performed in the manner of Fourier transform spectroscopy, in particular in the manner of Fourier transform infrared spectroscopy (FTIR for short). The constituents present in the cleaning fluid can be recognized from the spectrum obtained in the process. By way of example, it is possible to ascertain whether the spectrum has a peak at a characteristic wavelength of a specific constituent. Moreover, the constituents can be quantified. The height of a peak can be determined for this purpose.

The cleaning fluid can be analyzed on the basis of the light reflected and/or absorbed by the cleaning fluid. In order to use the reflected light, the light source unit and at least one detector of the detection unit are arranged on the same side of the line portion. The light from the light source unit can thus be guided into the line portion, be reflected by the cleaning fluid in the line portion, and pass out of the line portion into the at least one detector of the detection unit. The light source unit and the detection unit can be arranged next to one another, for example within a common housing. This configuration is preferred owing to the possibility of this compact design. In this configuration, in particular, it is preferred for the apparatus to comprise a MEMS.

In order to use the absorbed light, the light source unit and at least one detector of the detection unit are arranged on mutually opposite sides of the line portion. In that case, the line portion is arranged between the light source unit and the at least one detector of the detection unit. The light from the light source unit can thus be guided into the line portion and, insofar as it is not absorbed by the cleaning fluid in the line portion, it can pass out of the line portion into the detector.

If the detection unit has a plurality of detectors, these are preferably all arranged on the same side of the line portion. Thus, either the reflected light can be captured by all the detectors or the absence of the absorbed light can be captured by all the detectors. However, it is also conceivable for the detection unit both on the side of the light source unit and on the opposite side in each case to have one or more detectors. Both the reflected light and the absorbed light can be taken into account in that case.

The spectrum emitted by the light source unit can change over time. Therefore, it is preferred for the spectrum emitted by the light source unit to be measured as reference at regular intervals. Particularly preferably, a respective reference spectrum is recorded directly before each measurement for analysis purposes. If the analysis is performed on the basis of the reflected light, the spectrum measured for analysis purposes can be compared with a reference spectrum that was measured by an ideal reflector. If the analysis is performed on the basis of the absorbed light, the spectrum measured for analysis purposes can be compared with a reference spectrum that was measured with the line portion empty.

The apparatus described makes it possible to reduce the consumption of raw materials and energy and to shorten the time for the cleaning. By virtue of the cleaning time being shortened, more time remains for milking, and so a milking machine can be utilized more efficiently in this respect. The advantages described can be achieved because the cleaning fluid does not have to be provided such that sufficient cleaning is ensured even despite changed circumstances. Instead the apparatus described enables an analysis in real time. As a result, it is possible to react to changed circumstances. Changed circumstances that are conceivable include for example a changed quality of provided water that is used as the cleaning fluid or as part thereof. By way of example, if a cleaning fluid is obtained by admixing water with a chemical cleaning agent, the water quality can have an influence on the cleaning effect achievable with the cleaning fluid. The analysis by means of the apparatus described means that it is not necessary to pass a cleaning agent dispensed in an excessive dose in an unnecessarily large amount for an unnecessarily long time through the lines to be cleaned.

The cleaning progress can also be captured by the apparatus described. That is possible if the line portion itself is part of a line to be cleaned and/or is arranged downstream of a line part to be cleaned. In that case, the cleaning fluid flowing through the line portion can contain substances that originate from the line to be cleaned. In this regard, the cleaning fluid can contain for example milk that has been rinsed from the line portion. The apparatus described makes it possible to recognize when sufficient cleaning has taken place. That can be established for example by residues of milk, for example, in the cleaning fluid falling below a predefined limit value. As soon as that is the case, the corresponding cleaning step can be ended. Raw materials, energy and time can be saved as a result. Furthermore, water used as cleaning fluid for the purpose of subsequent rinsing can be examined with regard to a chemical cleaning agent by means of the apparatus described. In particular during a rinsing operation with water, the water quality can be determined in a return flow. Depending on the established concentration of the chemical cleaning agent, it is then possible to decide what purpose the water can still be used for. In this regard, water that has been slightly contaminated by subsequent rinsing can be used for prior rinsing in a subsequent cleaning process. The consumption of water can thus be reduced by use of the apparatus described because water does not have to be disposed of just on account of the possibility of contamination.

Furthermore, safety can be increased by the analysis of the cleaning fluid. By way of example, if a strongly acidic cleaning fluid is used in a first cleaning operation and a strongly alkaline cleaning fluid is used in a subsequent second cleaning operation, the apparatus described makes it possible to ensure that the strongly alkaline cleaning agent is introduced into the line to be cleaned only when a pH value therein has reached a predefined limit value. If necessary, the pH value can be increased by a rinsing operation with water, for example, before the strongly alkaline cleaning fluid is used. In this regard, contact between the strongly acidic cleaning fluid and the strongly alkaline cleaning fluid can be prevented and safety can be increased in this respect.

The result of the analysis carried out by the apparatus described is preferably stored, in particular on a nonvolatile data carrier. Such storage goes beyond temporary storage in a main memory. Logging takes place instead, and so it is possible to have recourse to the results of the analysis at a later time. This can be used for example to check warranty claims. In particular, the apparatus described makes it possible to recognize and record whether a cleaning fluid recommended by the manufacturer was used, or whether a cleaning fluid that could damage parts of the milking machine was used. A recommended cleaning fluid can be recognized by virtue of the cleaning fluid containing a tracer that is recognized by the apparatus.

In one preferred embodiment, the apparatus furthermore has a main line, wherein the line portion branches off from the main line and leads into the main line.

The line portion runs parallel to the main line. As a result, this embodiment admittedly does not allow analysis of the entire cleaning fluid. Nevertheless, the apparatus enables a more comprehensive analysis of the cleaning fluid than the examination of individual visual samples. Finally, part of the cleaning fluid flow can be examined thoroughly by the apparatus described.

The term "main line", in delimitation from the term "branch section", relates merely to the circumstance that the analysis of the cleaning fluid takes place in the branched-off line portion and thus in a separate line part. It is not necessary for the main line to have a larger flow cross section than the branched-off line portion.

Upstream of the measurement region, the line portion preferably has a filter screen. The latter can be arranged for example at a branching-off point at which the line portion branches off from the main line. The filter screen enables solid particles of a corresponding minimum size to be kept away from the line portion. Blockage of the line portion can be prevented as a result.

In a further preferred embodiment of the apparatus, the branch section leads into the main line via a first opening and a second opening, wherein the first opening and the second opening are arranged at a distance from one another in a height direction.

The height direction relates to the orientation of the apparatus during use as intended. By virtue of the openings being arranged at a distance from one another in the height direction, the opening arranged further down can serve with priority for liquid components in the line portion, while gaseous components can pass with priority through the upper one of the openings back into the main line. This separation allows the liquid components to flow in the lower region of the line portion in a particularly undisturbed manner. The cleaning fluid can therefore be analyzed with particularly high measurement accuracy. That is the case in particular in the preferred configuration in which the light source unit and the detection unit are arranged at the level of the lower half of the line portion. Particularly preferably, the light source unit and the detection unit are arranged below the line portion. This relates in each case to the arrangement of the light source unit and the detection unit in the height direction.

In a further preferred embodiment of the apparatus, the light source unit comprises a thermionic emission source.

Thermionic emission sources emit a continuous wavelength spectrum. Moreover, they are comparatively inexpensive. The thermionic emission source is preferably a halogen lamp. Such a lamp has a high and directional intensity.

A milking machine is presented as a further aspect of the invention. The milking machine comprises:
  a milking device,
  a cleaning fluid source connected to the milking device,
  an apparatus for analyzing a cleaning fluid originating from the cleaning source, comprising
    a line portion for the cleaning fluid,
    a light source unit, which emits light into the line portion,
    a detection unit for the spectrally resolved capture of light emerging from the line portion,
    and in particular
    an evaluation unit configured to analyze the cleaning fluid with regard to constituents on the basis of signals from the detection unit.

The described advantages and features of the apparatus are applicable and transferable to the milking machine, and vice versa. The apparatus contained in the milking machine is preferably designed like the apparatus described above.

The milking machine preferably serves for milking cows. The milking device is preferably designed as a milking cluster. Preferably, the milking machine has a milk tank, which is connected to the milking device via the line portion. The milking machine preferably comprises a plurality of milking devices connected to the milk tank. In order to prevent contaminations of the milk, the milking devices and lines attached thereto are cleaned regularly. This involves the use of a cleaning fluid which can be analyzed by the apparatus described while it is flowing through the line portion of the apparatus. The cleaning fluid is provided by way of the cleaning fluid source. The cleaning fluid source can be a cleaning fluid tank, for example. The line portion is correspondingly preferably part of a line intended to allow milk to flow through it. This line can be part of a milking device, such that the apparatus can correspondingly likewise be part of the milking device. Alternatively, this line can be attached to a milking device. In that case, the apparatus is not part of the milking device. As a further alternative, the line portion can be part of a feed line via which a cleaning fluid can be introduced into a line intended to allow milk to flow through it. The feed line is not intended to allow milk to flow through it. That concerns any point in time. During cleaning, the cleaning fluid flows through the line to be cleaned instead of the milk. Contact between the cleaning fluid and the milk is always avoided as much as possible.

The apparatus described additionally makes it possible to analyze the milk with regard to its constituents. In this case, the milk can be examined with regard to residues of the cleaning fluid or individual constituents of the cleaning fluid. This means greater safety vis-à-vis contaminations of the milk. The milk can generally be examined with regard to constituents such as fat, protein and lactose or with regard to contaminants such as antibiotics, dipping agents, cleaning agents or water. Moreover, it is possible to determine whether the milk contains solid particles, flakes, foam and bubbles. The analysis can consist in differentiating between the presence and absence of specific substances, without quantifying these substances. In this regard, it is possible to determine whether the milk has been contaminated. Alternatively or additionally, it is possible for example to establish what proportion of fat the milk has. The absence of a specific constituent can be established in particular by virtue of this constituent not being present in the milk in an amount that is measurable by the apparatus. The milk can be examined for example in regard to whether the milk contains blood and/or urea. The milk contaminated with blood and/or urea can then be segregated, preferably before it is mixed with other milk. In addition, blood in milk can indicate an injury of the animal from which the milk originates. Such milk may need to be discarded on account of legal requirements. If blood is recognized, the corresponding animal can be subjected to an examination in order to verify the animal's state of health. Furthermore, the analysis can consist in quantifying constituents. In this regard, for example, the proportion of protein, fat and/or lactose can be ascertained.

For the analysis of the cleaning fluid and the milk, the apparatus can use different evaluation algorithms. In this case, it is possible to switch between the analysis of the cleaning fluid and the milk in an automated manner, for example as a result of detection of specific constituents in the cleaning fluid or in the milk.

Preferably, the milking machine has a milk tank. The milk tank can be connected to the milking device via the line portion. That means that a connection between the milk tank and the milking device comprises the line portion. However, the line portion need not extend from the milk tank as far as the milking device. It is even preferred for further elements, such as a milk sluice, for example, to be arranged between the milking device and the milk tank. Moreover, it is not necessary for the milk tank and the milking device to be connected to one another exclusively via the line portion. It is even preferred for a main line to be connected to the milk tank and the milking device, and for the line portion to be arranged in a branch section which branches off from the main line and which leads into the main line again.

By way of example, the line portion can be arranged such that the milk from a specific teat can be analyzed. Preferably, in that case, a respective apparatus is provided for each teat, such that an animal's milk can be analyzed teat-specifically. This analysis can also be referred to as quarter-specific in the case of cows. The cleaning fluid used for cleaning the corresponding lines can be analyzed by these apparatuses. It is thus possible to ensure that the lines to each teat are cleaned sufficiently. Alternatively or additionally, it is possible to arrange an apparatus with a line portion downstream of a milk collecting piece, such that the milk can be analyzed animal-specifically or the cleaning fluid in the lines can be analyzed milking stall by milking stall. In this regard, a cleaning efficiency can be ascertained milking stall by milking stall. Alternatively or additionally, it is possible to arrange an apparatus with a line portion between milking stall and milk tank. Alternatively or additionally, it is possible to arrange an apparatus with a line portion in the region of a junction combining the milk from a plurality of milking stalls. Alternatively or additionally, it is possible to arrange an apparatus with a line portion directly at the milk tank. It is also conceivable to arrange an apparatus with a line portion between an automatic cleaning system and a milking stall. An apparatus with a line portion can also be arranged in lines for milk that is not marketable.

The line portion is preferably able to be shut off. The fact that the milk tank is connected to the milking device via the line portion should be assessed independently of the position of a corresponding shut-off valve. In other words, the closing of a shut-off valve cannot deprive a line portion of the property thereof that the milk tank is connected to the milking device via said line portion.

A method for operating a milking machine is presented as a further aspect of the invention. The method comprises:
a) guiding light into a line portion of the milking machine, through which line portion a cleaning fluid flows,
b) spectrally resolved detection of light emerging from the line portion,
c) analyzing the cleaning fluid with regard to constituents on the basis of the light detected in accordance with step b).

The described advantages and features of the apparatus and of the milking machine are applicable and transferable to the method, and vice versa. The method is preferably carried out by means of the apparatus described, and in particular by means of the milking machine described. The apparatus and the milking machine are preferably suitable for carrying out the method described.

It is sufficient to carry out each of steps a) to c) once. A snapshot can be obtained as a result. It is preferred, however, for each of steps a) to c) to be carried out a number of times. A series of spectra can thus be recorded and evaluated in each case. In this regard, the cleaning fluid can be analyzed in particular at constant time intervals. As a result, it is possible to capture a temporal development during a cleaning operation. In this regard, in particular, different cleaning operations can be covered, for example prior rinsing, main cleaning and subsequent rinsing. Preferably, a plurality of spectra are in each case recorded and evaluated during each cleaning operation.

The analysis can be performed continuously or discontinuously. In this case, a continuous analysis should be understood to mean that a respective spectrum is recorded and analyzed in successive measurement times. The measurement time is preferably 1 to 2 seconds per measurement. A discontinuous measurement should be understood to mean that a respective spectrum is recorded and analyzed in measurement times separated from one another temporarily. In that case, too, the measurement time is preferably 1 to 2 seconds per measurement. The frequency of the measurements here can be constant or variable. The analysis can be performed before, during or after the cleaning. In this regard, for example, the cleaning fluid in a line to be cleaned can be analyzed during the cleaning.

The cleaning agent serves for cleaning the milking device and/or lines of the milking machine. These lines are intended for milk. During the cleaning, the cleaning fluid flows through the lines instead of the milk. The milk and the cleaning fluid do not come into contact with one another. The line portion can be part of such a line or part of a feed line that leads into a line intended for milk. The cleaning can comprise various cleaning operations, for example prior rinsing, main cleaning, intermediate cleaning and subsequent rinsing. The main cleaning can comprise a cold cleaning process and a hot cleaning process. The cleaning fluid can be acidic, neutral or alkaline. In particular, different cleaning fluids can be used in different cleaning operations.

In one preferred embodiment of the method, an evaluation algorithm is created by machine learning before step c), wherein the cleaning fluid is analyzed using the evaluation algorithm in step c).

In order to create the evaluation algorithm, signals from the detection unit together with corresponding reference values are fed to the machine learning program. The reference values can be obtained by the cleaning fluid analyzed as described being additionally analyzed by a laboratory examination, for example. Patterns between features of the signals from the detection unit and the reference values are recognized in this case.

The machine learning program can be part of a separate device. In particular, the machine learning program can be installed on a computer that is not part of the apparatus described here. The machine learning program can be installed on a development tool, for example.

The evaluation algorithm can be created by the separate device and subsequently—if the apparatus has an evaluation unit—be communicated to the evaluation unit. Alternatively, the evaluation algorithm created by the separate device can be communicated by the separate device to a server used for analyzing the cleaning fluid. This does not necessitate permanent contact between the separate device and the evaluation unit or the server. The signals from the detection unit can be communicated to the separate device in various ways, for example via the Internet or via a cable connection. If the apparatus has an evaluation unit, the evaluation algorithm created can be communicated to the evaluation unit in an identical way. The separate device can be spatially separated from the evaluation unit or can be arranged together with the latter in a common housing.

The evaluation algorithm can be created or changed by means of machine learning by the evaluation unit or a server itself that is used to analyze the cleaning fluid, for example by the use of artificial intelligence.

It is sufficient for the evaluation algorithm to be created once. In this regard, by way of example, in a learning phase, it is possible to process a plurality of signals from the detection unit with a respectively corresponding reference value. It is preferred for the evaluation algorithm to be revised in particular at regular time intervals. For this purpose, in a new learning phase, a new evaluation algorithm can be created or the previous evaluation algorithm can be updated. The milking machine described preferably comprises a device for creating an evaluation algorithm from signals from the detection unit and corresponding reference values. The device preferably has a machine learning program. In that case, the evaluation unit is configured to analyze the cleaning fluid on the basis of signals from the detection unit by applying the evaluation algorithm. A server that is simultaneously used for the analysis of the cleaning fluid is also conceivable as the device.

In a further preferred embodiment of the method, a filling level of the line portion is determined in step c).

The filling level of the line portion can provide information regarding whether enough cleaning fluid was used for the cleaning. Sufficient cleaning can thus be ensured. In this regard, it is possible in particular to recognize whether walls of the line portion are fully wetted with the cleaning fluid. In addition, the time at which cleaning takes place can be recognized in an automated manner.

In a further preferred embodiment, the method furthermore comprises:
d) changing a chemical composition of the cleaning fluid on the basis of the results determined in step c).

In this embodiment, the result of the analysis is utilized for feedback. In this regard, the composition of the cleaning fluid can be controlled to one or more predefined target values. If the composition determined in step c) deviates from the target values, a corresponding correction can be performed. In this case, the correction does not have to be carried out on the same part of the cleaning agent which was also analyzed. In this regard, for example, proceeding from a cleaning fluid source, a continuous flow of the cleaning agent can be passed through the line portion and analyzed in the process. The analysis can take place between the cleaning fluid source and a line to be cleaned in a line portion that is not intended to allow milk to flow through it. If the cleaning fluid is a mixture, for example comprising water and a chemical cleaning agent, the mixing efficiency can be ascertained by the apparatus. The results obtained during the analysis can be utilized to change the composition of the cleaning agent dispensed by the cleaning fluid source. That can take place during ongoing cleaning or after cleaning for subsequent cleaning. Alternatively or additionally, it is also conceivable to change the composition of the cleaning agent downstream of the line portion, such that the feedback affects that part of the cleaning agent which has also been analyzed. The analysis of the cleaning fluid also makes it possible to recognize and/or localize faults for example on valves in the milking machine. That is possible particularly if the cleaning fluid is analyzed by a respective apparatus at a plurality of points and the results obtained are compared with corresponding expected values.

In a further preferred embodiment of the method, step c) involves ascertaining whether at least one predefined consistent in the cleaning fluid exceeds a respective limit value.

In this embodiment, the presence or absence of one or more specific constituents is examined. That is expedient for a chemical cleaning agent, for example. In this case, a distinction is drawn between presence and absence on the basis of the predetermined limit value.

In a further preferred embodiment of the method, an evaluation algorithm used in step c) is changed.

In this embodiment, the described analysis of the cleaning fluid is performed firstly by a first evaluation algorithm and then by a second evaluation algorithm. The evaluation algorithm can be changed from the first evaluation algorithm to the second evaluation algorithm by means of a software update, for example. The first evaluation algorithm and the second evaluation algorithm differ from one another, for example with regard to the detectable constituents of the cleaning fluid and/or with regard to the achievable measurement accuracy.

In a further preferred embodiment of the method, the following steps are carried out cyclically:
A) collecting cleaning fluid in the line portion,
B) analyzing the cleaning fluid situated in the line portion in accordance with steps a) to c),
C) discharging the cleaning fluid analyzed in step B) from the line portion.

This embodiment involves discontinuously analyzing the cleaning fluid in the line portion. For this purpose, the cleaning fluid is introduced into the line portion, and the line portion is shut off in such a way that the cleaning fluid collects in the line portion (step A)). That can be done for example by the closing of a shut-off valve downstream of the line portion. As soon as a desired amount of the cleaning fluid has collected in the line portion, this cleaning fluid can be analyzed (step B)). This can be done particularly reliably because the cleaning fluid is at rest during the measurement. Step B) is preferably begun only after step A) has finished. The measurement time is preferably between 0.5 and 5 seconds, in particular between 1 and 2 seconds. The line portion is preferably shut off during the measurement time. The cleaning fluid is correspondingly at rest over the measurement time. After the analysis, the cleaning fluid can be passed out of the line portion (step C)). For this purpose, for example, the shutting-off can be opened again. Step C) is preferably begun only when step B) has finished. Afterward, steps A) to C) are repeated. In this case step C) of a cycle can coincide with step A) of the subsequent cycle. In this regard, the analyzed cleaning fluid can be passed from the line portion in a procedure in which the cleaning fluid to be analyzed in the subsequent cycle is introduced into the line portion.

If the evaluation algorithm used in step c) is changed, this is preferably done between two cycles in this embodiment.

Figure 2:
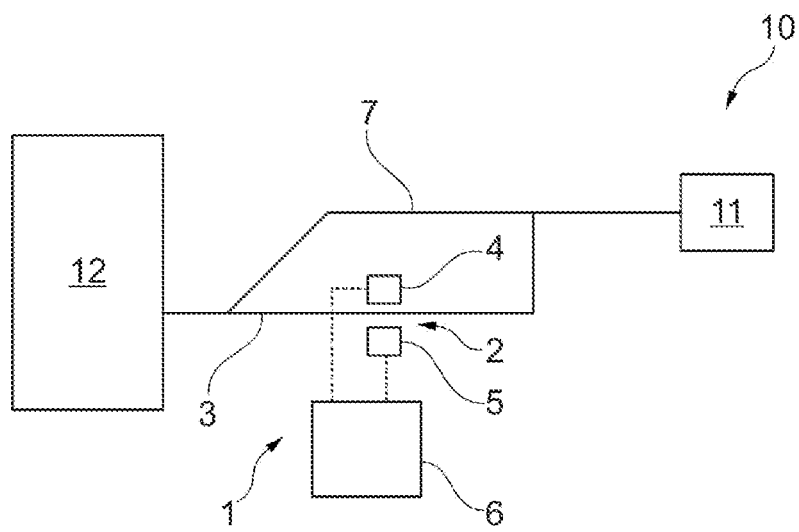
Figure 3:
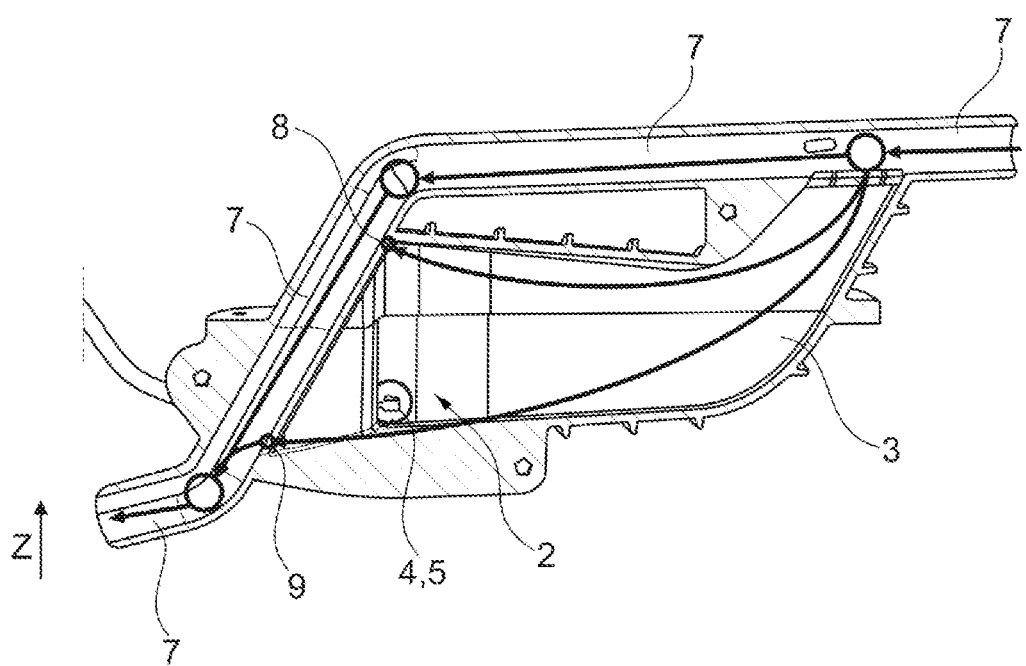
Figure 4A:
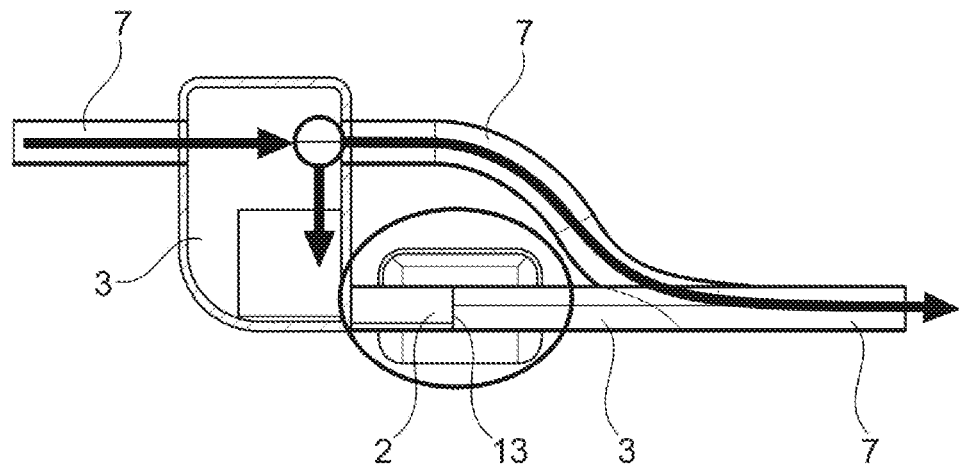
Figure 4B:
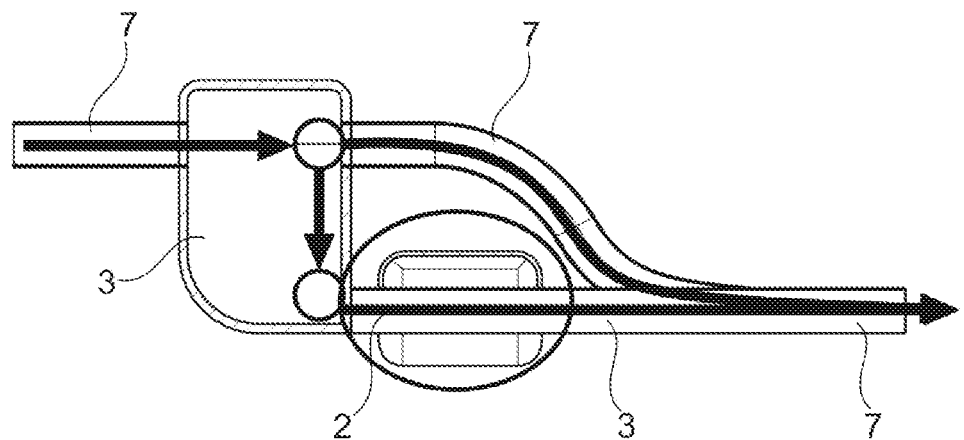
Figure 5:
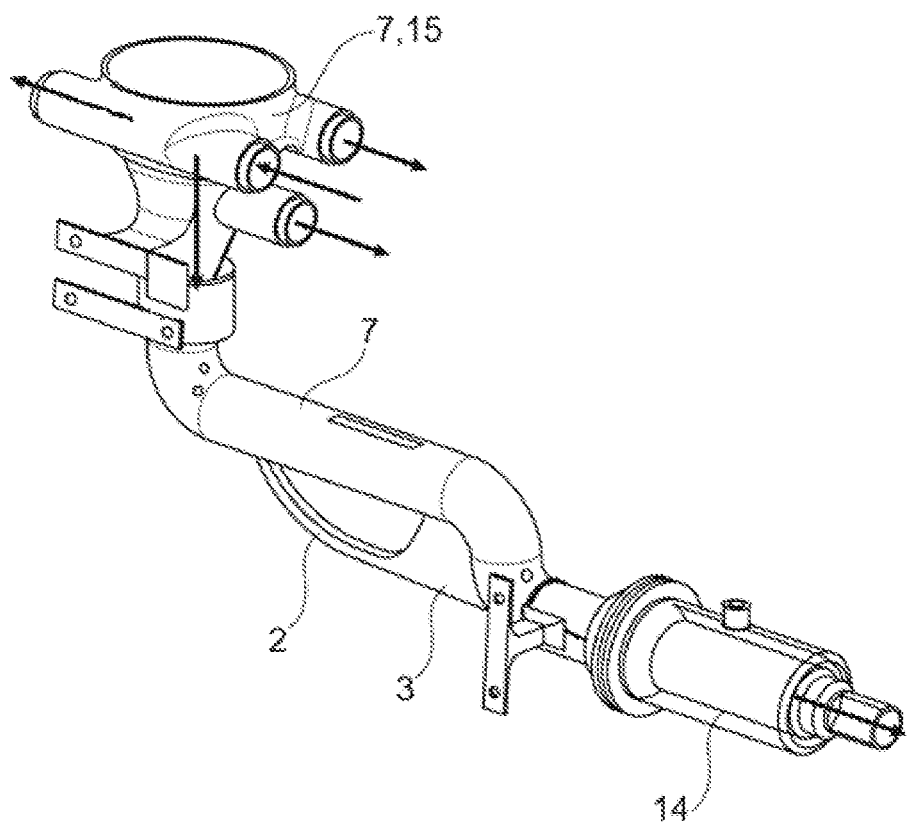
Figure 6:
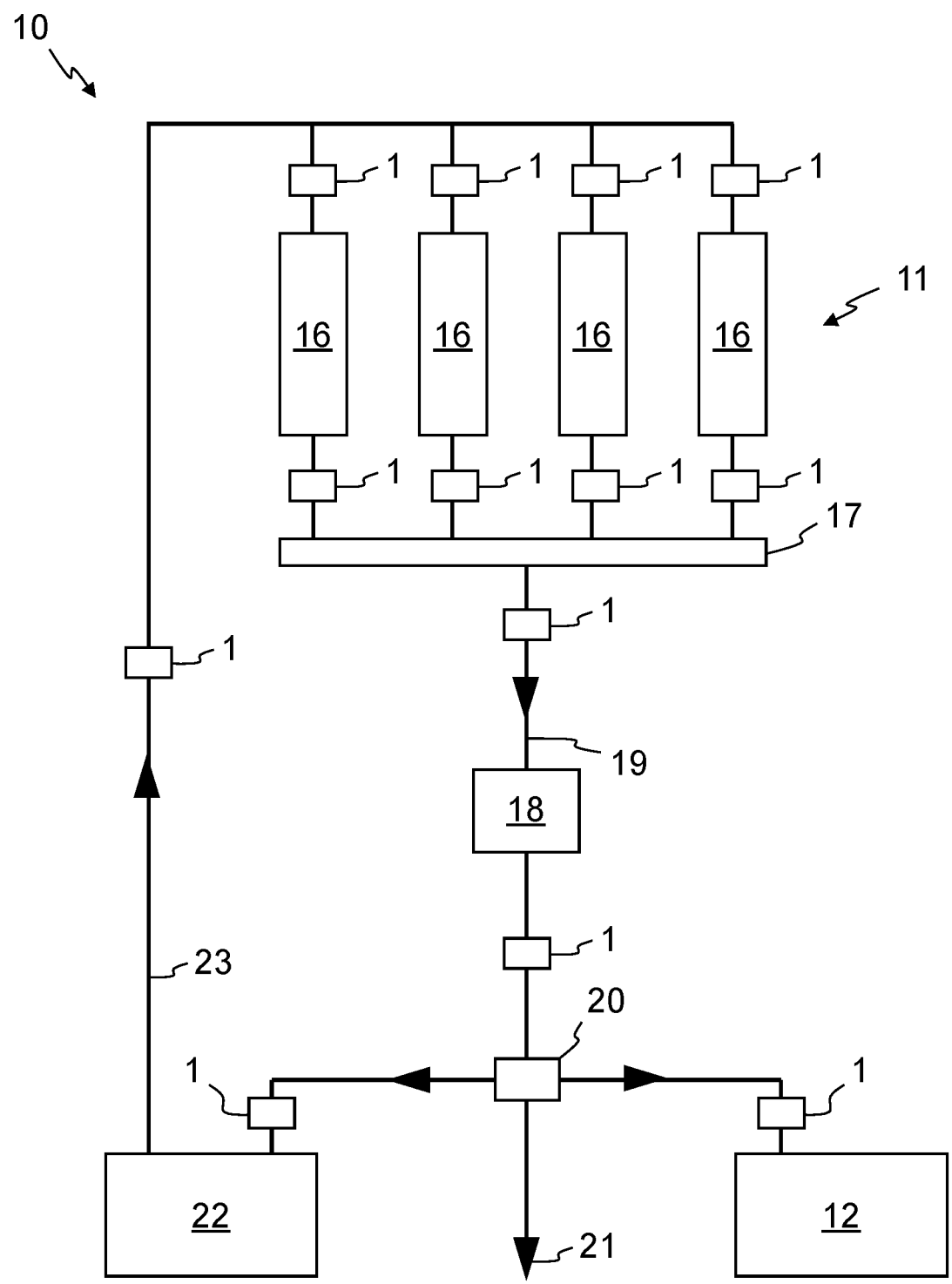
Figure 7:
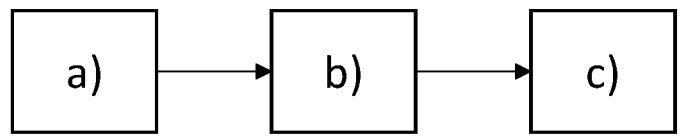
Figure 8:
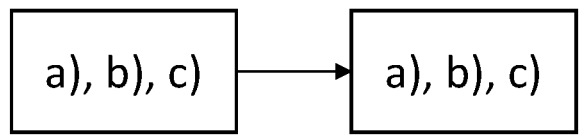
Figure 9:
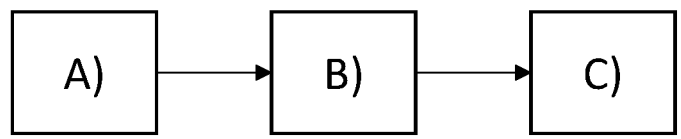

The invention is explained in greater detail below with reference to the figures. The figures show particularly preferred exemplary embodiments, to which the invention is not limited, however. The figures and the size ratios illustrated therein are merely schematic, in which:

FIG. 1: shows a first embodiment of a milking machine according to the invention, FIG. 2: shows a second embodiment of a milking machine according to the invention, FIG. 3: shows a first embodiment of an apparatus according to the invention for analyzing cleaning fluid, FIG. 4a,4b: show a second embodiment of an apparatus according to the invention for analyzing cleaning fluid, FIG. 5: shows a third embodiment of an apparatus according to the invention for analyzing cleaning fluid, FIG. 6: shows a third embodiment of a milking machine according to the invention, FIG. 7: shows a first flow diagram of a method according to the invention for analyzing cleaning fluid, FIG. 8: shows a second flow diagram of a method according to the invention for analyzing cleaning fluid, FIG. 9: shows a third flow diagram of a method according to the invention for analyzing cleaning fluid.

FIG. 1 shows a milking machine 10 having a milking device 11 and a milk tank 12. The milking device 11 is connected to the milk tank 12 by a main line 7. A branch section 3 is provided parallel to the main line 7, said branch section branching off from the main line 7 and leading into the main line 7 again. During milking, milk from the milking device 11 can be passed into the milk tank 12 via the main line 7 and the branch section 3. After a milking operation, the milking device 11, the main line 7 and the branch section 3 can be cleaned using a cleaning fluid. For this purpose, the cleaning fluid can be introduced into the milking device 11 for example where the milk arrives during milking. In order that the cleaning fluid does not come into contact with the milk in the milk tank 12, the cleaning fluid is discharged from the main line 7 upstream of the milk tank 12 via an outlet (not shown). In a line portion 2 of the branch section 3, the cleaning fluid can be analyzed during a cleaning operation. During milking, the milk obtained by milking can be analyzed by the same apparatus 1. The milking device 11 is connected to the milk tank 12 via the branch section 3 and in this respect via the line portion 2. For the purpose of analyzing the cleaning fluid the milking machine 10 has a halogen lamp as a light source unit 4, which emits light with a continuous wavelength spectrum into the line portion 2. Furthermore, the milking machine 10 has a detection unit 5 for the spectrally resolved capture of light emerging from the line portion 2. The detection unit 5 is connected to an evaluation unit 6 configured to analyze the cleaning fluid with regard to constituents on the basis of signals from the detection unit 5. The cleaning fluid and respectively the milk can be analyzed when they are passed through the line portion 2 proceeding from the milking device 11. The analysis can involve ascertaining for example whether the cleaning fluid has a chemical cleaning agent in a sufficient concentration. The line portion 2, the light source unit 4, the detection unit 5 and the evaluation unit 6 form an apparatus 1 for analyzing cleaning fluid.

FIG. 2 shows a milking machine 10 similar to that from FIG. 1. It is just that here the light source unit 4 and the detection unit 5 are arranged on mutually opposite sides of the line portion 2. Consequently, the absorption of light can be measured in accordance with FIG. 2, while the reflection can be measured in accordance with FIG. 1.

FIG. 3 shows part of a first embodiment of a milking machine 10 according to FIG. 1 or 2. On account of the merely schematic illustration in FIGS. 1 and 2, various embodiments of milking machines 10 can be designed according to FIGS. 1 and 2. The main line 7 with a branch section 3 is shown. The light source unit 4 and the detection unit 5 are arranged in such a way that it is possible to analyze the cleaning fluid or respectively the milk in part of the branch section 3. The branch section 3 constitutes a line portion 2. The branch section 3 leads into the main line 7 via a first opening 8 and a second opening 9. The first opening 8 is arranged higher than the second opening 9 in a height direction z. A gaseous component can pass into the main line 7 from the branch section 3 via the first opening 8, while a liquid component can pass into the main line 7 from the branch section 3 via the second opening 9.

FIGS. 4a and 4b show part of a second embodiment of a milking machine 10 according to FIG. 1 or 2. The main line 7 is shown, with through-flow from left to right in this illustration. The line portion 2 in the branch section 3 is able to be shut off in this configuration. A shut-off element 13 is provided for this purpose. The latter is closed in FIG. 4a. As a result, the cleaning fluid or respectively the milk can be collected in the line portion 2 and analyzed therein. After the analysis has finished, the shut-off element 13 can be opened and the analyzed cleaning fluid and respectively the analyzed milk can thus be passed from the line portion 2. At the same time, new cleaning fluid or respectively new milk can flow into the line portion 2. Renewed closing of the shut-off element 13 enables this new cleaning fluid or respectively this new milk to be collected in the line portion 2. These steps can be repeated cyclically.

FIG. 5 shows part of a third embodiment of a milking machine 10 according to FIG. 1 or 2. The main line 7 is shown, which here comprises a cyclone geometry 15 and is attached to a valve 14 for a teat cup liner. The valve 14 is part of the milking device 11.

FIG. 6 shows a milking machine 10 having a milking device 11. The milking device 11 has four milking cups 16 by way of example. Milk obtained by milking can be introduced into a milking line 19 from the milking cups 16 via a milk collecting piece 17. Through the milking line 19, the milk can be introduced into a milk tank 12 via a milk sluice 18 and a distributor 20. A vacuum used for milking is present upstream of the milk sluice 18. No vacuum is present downstream of the milk sluice 18. The distributor 20 is set during milking such that the milking line 19 is connected to the milk tank 12. The milk tank 12 can be connected to more than the one milking device 11 shown.

The lines of the milking machine 10 can be cleaned using a cleaning fluid. For this purpose, when no milking operation is taking place, the cleaning fluid is introduced into the milking cups 16 from a cleaning fluid tank as a cleaning fluid source 22 via a feed line 23. The cleaning fluid can pass through the milking cups 16, the milk collecting piece 17, the milking line 19, the milk sluice 18 to the distributor 20 and manifest a cleaning effect in the process. From the distributor 20, the cleaning fluid can be disposed of via an outflow 21 or can be returned to the cleaning fluid source 22.

The cleaning fluid can be analyzed by apparatuses 1. The depicted positions of the apparatuses 1 are by way of example. It is sufficient for the milking machine 10 to have any arbitrary one of the depicted apparatuses 1. The milking machine 10 can also have any arbitrary combination of a plurality of the depicted apparatuses 1 or else all of the depicted apparatuses 1. Moreover, the milking machine 10 can have one or more apparatuses at further points. One or more milking machines 10 can be attached to a cleaning fluid source.

The cleaning fluid can be analyzed by the apparatuses 1. The information obtained in the process can be recorded for logging purposes and/or can be utilized for feedback. In this regard, the data determined by the apparatus 1 can be communicated for example to a server (not illustrated for the sake of clarity). By means of the server, it is possible to intervene in the cleaning process on the process of these data, for example by changing the composition of the cleaning fluid. By way of example, the apparatus 1 in the feed line 23 can be utilized to control the composition of the cleaning fluid to predefined target values. By means of the apparatus 1 between the milk sluice 18 and the distributor 20, it is possible to analyze the cleaning fluid after the cleaning of the milking device 11. By way of example, the information obtained in this case can be taken as a basis for deciding whether or not water used as cleaning fluid can be passed into the outflow 21.

FIG. 7 illustrates a method for operating a milking machine 10, which method can be carried out by means of the apparatuses 1 and milking machines 10 shown above. The method comprises:
a) guiding light into a line portion 2, through which line portion a cleaning fluid flows,
b) spectrally resolved detection of light emerging from the line portion 2,
c) analyzing the cleaning fluid with regard to constituents on the basis of the light detected in accordance with step b).

FIG. 8 illustrates one embodiment of the method from FIG. 7, wherein the evaluation algorithm is changed. In this embodiment, the described analysis of the cleaning fluid is performed firstly by a first evaluation algorithm and then by a second evaluation algorithm.

FIG. 9 illustrates a further embodiment of the method from FIG. 7, wherein the following steps are carried out cyclically:
A) collecting cleaning fluid in the line portion 2,
B) analyzing the cleaning fluid situated in the line portion 2 in accordance with steps a) to c),
C) discharging the cleaning fluid analyzed in step B) from the line portion 2.

LIST OF REFERENCE SIGNS

1 Apparatus
2 Line portion
3 Measurement region
4 Light source unit
5 Detection unit
6 Evaluation unit
7 Main line
8 First opening
9 Second opening
10 Milking machine
11 Milking device
12 Milk tank
13 Shut-off element
14 Valve
15 Cyclone geometry 16 Milking cup
17 Milk collecting piece
18 Milk sluice
19 Milking line
20 Distributor
21 Outflow
22 Cleaning fluid source
23 Feed line
z Height direction

The invention claimed is:

1. An apparatus for analyzing a cleaning fluid, comprising:
- a line portion for the cleaning fluid;
- a light source unit, which emits light with a continuous spectrum into the line portion;
- a detection unit for the spectrally resolved capture of light emerging from the line portion, wherein the detection unit comprises a means for spectrally decomposing the light; and
- an evaluation unit configured to analyze the cleaning fluid with regard to constituents on the basis of signals from the detection unit.

2. The apparatus as claimed in claim 1, furthermore having a main line, wherein the line portion branches off from the main line and leads into the main line.

3. The apparatus as claimed in claim 2, wherein the line portion leads into the main line via a first opening and a second opening, and wherein the first opening and the second opening are arranged at a distance from one another in a height direction.

4. The apparatus as claimed in claim 1, wherein the light source unit comprises a thermionic emission source.

5. A milking machine, comprising:
- a milking device;
- a cleaning fluid source connected to the milking device;
- an apparatus for analyzing a cleaning fluid originating from the cleaning source, the apparatus including:
  - a line portion for the cleaning fluid;
  - a light source unit, which emits light with a continuous spectrum into the line portion;
  - a detection unit for the spectrally resolved capture of light emerging from the line portion, wherein the detection unit comprises a means for spectrally decomposing the light; and
  - an evaluation unit configured to analyze the cleaning fluid with regard to constituents on the basis of signals from the detection unit.

6. The milking machine as claimed in claim 5, wherein the apparatus furthermore has a main line, wherein the line portion branches off from the main line and leads into the main line.

7. A method for operating a milking machine, comprising:
a) guiding light with a continuous spectrum into a line portion of the milking machine, through which line portion a cleaning fluid flows;
b) spectrally resolved detecting of light emerging from the line portion, wherein the light is spectrally decomposed in order to determine a plurality of individual spectral values within the continuous wavelength spectrum of the light; and
c) analyzing the cleaning fluid with regard to constituents on the basis of the light detected in accordance with step b).

8. The method as claimed in claim 7, wherein an evaluation algorithm is created by machine learning before step c), and wherein the cleaning fluid is analyzed using the evaluation algorithm in step c).

9. The method as claimed in claim 7, wherein a filling level of the line portion is determined in step c).

10. The method as claimed in claim 7, furthermore comprising:
d) changing a chemical composition of the cleaning fluid on the basis of the results determined in step c).

11. An apparatus for analyzing a cleaning fluid, comprising:
- a main line for the cleaning fluid;
- a line portion for the cleaning fluid, wherein the line portion branches off from the main line and leads into the main line;
- a light source unit, which emits light into the line portion;
- a detection unit for the spectrally resolved capture of light emerging from the line portion; and
- an evaluation unit configured to analyze the cleaning fluid with regard to constituents on the basis of signals from the detection unit.

12. A milking machine, comprising:
- a milking device;
- a cleaning fluid source connected to the milking device;
- an apparatus for analyzing a cleaning fluid originating from the cleaning source, the apparatus including:
  - a main line for the cleaning fluid;
  - a line portion wherein the line portion branches off from the main line and leads into the main line;
  - a light source unit, which emits light into the line portion;
  - a detection unit for the spectrally resolved capture of light emerging from the line portion; and
  - an evaluation unit configured to analyze the cleaning fluid with regard to constituents on the basis of signals from the detection unit.

* * * * *